(12) United States Patent
Allen et al.

(10) Patent No.: US 8,209,357 B2
(45) Date of Patent: Jun. 26, 2012

(54) SELECTING APPLICATIONS FOR MIGRATION FROM A POD ENVIRONMENT TO A POOL ENVIRONMENT

(75) Inventors: Michael L Allen, Colorado Springs, CO (US); Steven S Watson, Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 287 days.

(21) Appl. No.: 12/427,967

(22) Filed: Apr. 22, 2009

(65) Prior Publication Data

US 2010/0274806 A1    Oct. 28, 2010

(51) Int. Cl.
*G06F 17/30* (2006.01)
*G06F 7/00* (2006.01)

(52) U.S. Cl. ........................................ 707/802; 707/758

(58) Field of Classification Search .................. 707/802
See application file for complete search history.

(56) References Cited

U.S. PATENT DOCUMENTS

| 7,752,255 B2* | 7/2010 | Cohen et al. ............... 709/202 |
| 7,801,541 B2* | 9/2010 | Daniel et al. ............... 455/466 |
| 7,912,800 B2* | 3/2011 | Sattler et al. ............... 706/46 |

* cited by examiner

*Primary Examiner* — Kuen Lu (57) ABSTRACT

A device may receive a selection of an application from a client device, send two or more sets of questions related to the application to the client device, receive answers to the two or more sets of questions from the client device, obtain a score for each of the sets of questions based on the answers, determine whether the application is to be ported from a first computing environment to a virtual computing environment based on the scores, and send results of the determination to the client device.

20 Claims, 12 Drawing Sheets

| | Application | Score | Technical | Business |
|---|---|---|---|---|
| 1 | 16775 / GCX | 1800000 | 9.5 | 8.5 |
| 2 | 266 / DCS | 1800000 | 10.5 | 7.5 |
| 3 | 15314 / BARSweb | 1750000 | 10.0 | 7.5 |
| 4 | 1715 / GCS1 | 1610000 | 8.0 | 8.1 |
| 5 | 407 / TurboDXC | 1510000 | 8.0 | 7.1 |
| 6 | 226 / ChAMPS | 1510000 | 9.5 | 5.6 |
| 7 | 1675 / IPREMS | 1460000 | 9.5 | 5.1 |
| 8 | 4491 / Symphony | 1460000 | 6.5 | 8.1 |
| 9 | 1101 / LTS | 1450000 | 7.0 | 7.5 |
| 10 | 8356 / NSSX | 1410000 | 7.0 | 7.1 |
| 11 | 417 / PLC | 1360000 | 6.5 | 7.1 |
| | 1578 / EDIS | 1360000 | 6.5 | 7.1 |
| | 1920 / LNP | 1260000 | 8.5 | 4.1 |
| | 1876 / E-Payment | 1210000 | 5.0 | 7.1 |
| | 16855 / ECC | 1160000 | 6.5 | 5.1 |
| | 15655 / VAST | 1160000 | 7.0 | 4.6 |
| | 16934 / IDW | 1160000 | 7.5 | 4.1 |
| | 14032 / VC5 | 1160000 | 4.5 | 7.1 |
| | 1728 / DTS1 | 1150000 | 7.0 | 4.5 |
| | 18823 / ECS II | 1150000 | 7.0 | 4.5 |
| | 1836 / IPTS | 1110000 | 7.0 | 4.1 |
| | 4494 / ICP | 1050000 | 4.0 | 6.5 |
| | 945 / Portfolio | 1000000 | 5.5 | 4.5 |
| | 1595 / eBilling | 950000 | 5.5 | 4.0 |
| | 15254 / BOBCO | 900000 | 4.0 | 5.0 |
| | 403 / TPS | 760000 | 3.5 | 4.1 |
| | 667 / IntradaPro | 510000 | 9.0 | -3.9 |
| | 18074 / ITW | 410000 | -1.0 | 5.1 |
| | 1579 / EM | 310000 | 8.0 | -4.9 |
| | 225 / CDMS | 260000 | 9.5 | -7.0 |
| | 6476 / FACT | 200000 | 6.0 | -4.0 |
| | 1719 / TCOMS | 160000 | 7.5 | -5.9 |
| | 368 / Netpro | -40000 | 8.5 | -8.9 |
| | 1815 / EIB | -150000 | 7.5 | -9.0 |
| | 18175 / EBGW | -150000 | 3.0 | -4.5 |
| | 18841 / CTMSD | -350000 | 4.0 | -7.5 |
| | 18799 / FEV | -440000 | 6.5 | -10.9 |
| | 826 / OCMR | -540000 | 5.5 | -10.9 |
| | 1958 / IRIS | -590000 | 2.0 | -7.9 |
| | 1717 / DCS1 | -1740000 | 5.5 | -22.9 |
| | 18842 / CTSLOGIX | -1750000 | 1.0 | -18.5 |

SELECTING APPLICATIONS FOR MIGRATION FROM A POD ENVIRONMENT TO A POOL ENVIRONMENT

BACKGROUND INFORMATION

The term "virtualization" encompasses creating and running a simulated computer environment (e.g., a virtual machine) on a hardware or software platform. The simulated computer environment may, in turn, include a software system (e.g., operating system) that hosts one or more applications.

DETAILED DESCRIPTION OF PREFERRED EMBODIMENTS

The following detailed description refers to the accompanying drawings. The same reference numbers in different drawings may identify the same or similar elements.

Embodiments described herein relate to determining whether an application may be ported from one computing environment (e.g., a pod environment) to another computing environment (e.g., a pool environment). As used herein, the term "pod environment" may refer to a virtual environment (e.g., hardware or software) in which one or more instances of a single application execute. Further, as used herein, the term "pool environment" may refer to a virtual environment in which instances of multiple different applications execute. To port the application, the application may be identified or selected based on specific criteria as candidates that have the ability to leverage virtualization technologies, irrespective of storage devices or network connectivity. When ported from a one environment to another, the application may use hardware resources more efficiently (e.g., greater use of central processing unit (CPU)).

Figure 1:
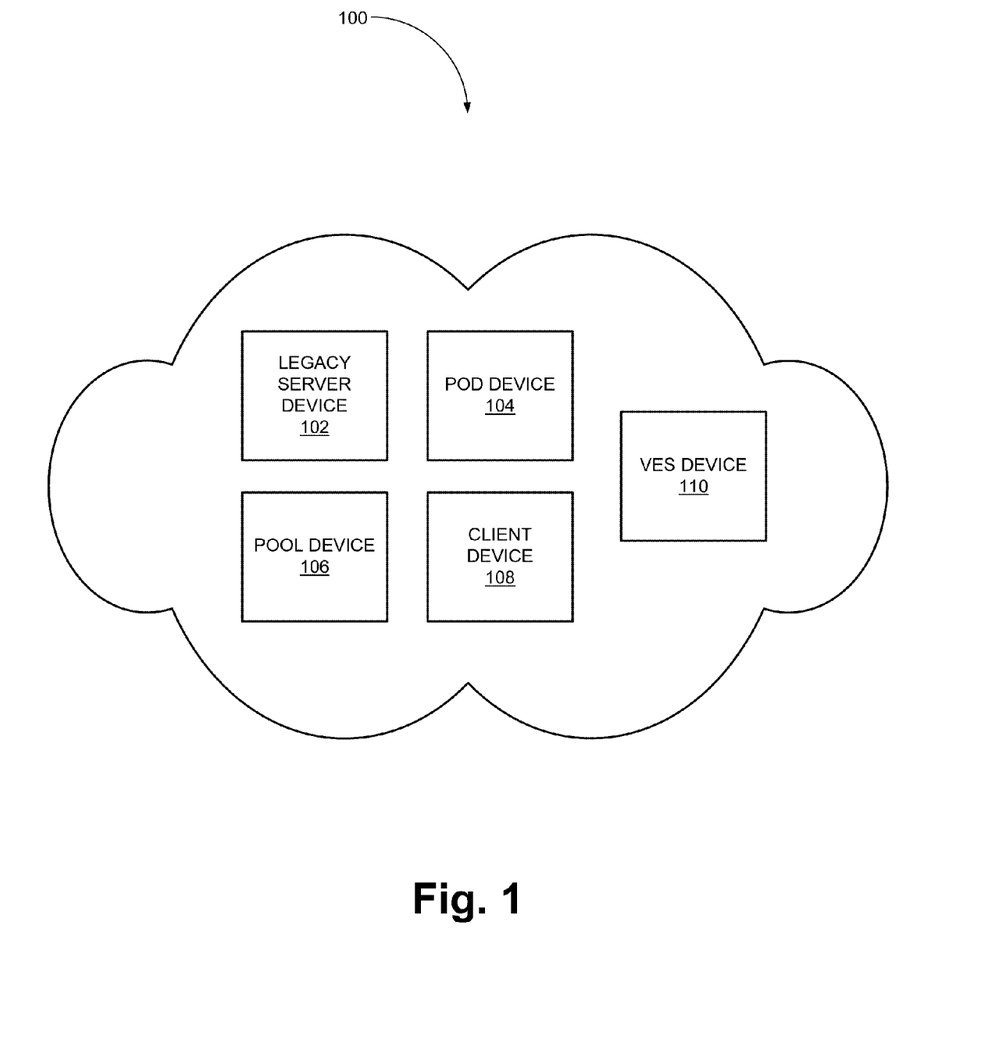
FIG. 1 shows an exemplary network in which concepts described herein may be implemented.

FIG. 1 shows an exemplary network 100 in which concepts described herein may be implemented. Network 100 may include one or more wired and/or wireless networks that are capable of exchanging information, such as voice, video, documents, multimedia, text, etc. For example, network 100 may include one or more public switched telephone networks (PSTNs) or another type of switched network. Network 100 may also include one or more wireless networks and may include a number of transmission towers for receiving wireless signals and relaying the received signals toward the intended destination. Network 100 may further include one or more packet switched networks, such as an IP based network, a local area network (LAN), a wide area network (WAN), a personal area network (PAN), an intranet, the Internet, or another type of network that is capable of exchanging information.

As shown in FIG. 1, network 100 may include legacy server devices 102, a pod device 104, a pool device 106, a client device 108, and a virtualization evaluation server (VES) device 110. For simplicity and ease of understanding, network 100 of FIG. 1 does not show other network components, such as switches, bridges, etc. or interconnections (e.g., connections between VES device 110 and client device 108). In addition, network 100 may include fewer, additional, or different devices than those illustrated in FIG. 1. For example, in one embodiment, network 100 may include additional legacy server devices, pod devices, pool devices, client devices, and/or VES devices.

Legacy server devices 102 may include end-of-service life (EOSL) devices in different models, and may host EOSL operating systems. In some embodiments, legacy server devices 102 may include open source software and third party products (3PPs) in different versions. Such server devices 102 may employ a virtual storage optimizer (VSO) on storage area networks (SANs) and may run non-current standalone databases. In addition, such legacy server devices 102 may use approximately 15% of available hardware resources (e.g., 15% of CPU time), and may communicate with other devices via fast Ethernet.

Pod device 104 may include different types of computing devices, operating systems and/or hardware/software components. In some embodiments, pod device 104 may include standard vendor devices and operating systems (e.g., Windows 2003, Linux, Solaris, etc.), open source software (e.g., Golden image products), and standard and non-standard 3PPs. Such pod device 104 may employ standard T-carrier 1 (T1) SAN and run standard databases (e.g., Oracle Grid implementations) for storage. Further, such pod device 104 may communicate with other devices via gigabit Ethernet (GigE), and may use approximately 40% of available hardware resources (e.g., 40% of available CPU time).

Pool device 106 may include different types of computing devices, operating systems, and/or hardware/software components. In some embodiments, pool device 106 may include standard vendor devices, virtual devices and operating systems (e.g., Windows 2003, Linux, Solaris), open source software (e.g., Golden image products), and standard 3PPs in up-to-date versions. Such pool device 106 may employ standard T1 SAN and virtual storage, and run a grid of databases (e.g., Oracle Grid, MySQL grid, Postgres grid, etc.). Further, such pool device 106 may communicate with other devices via gigabit Ethernet (GigE), and may use approximately 60% of available hardware resources (e.g., 60% of available CPU time).

Pod device 104 and pool device 106 may provide virtualization tools, such as VMWare, Solaris containers, etc. In different embodiments, devices 102-106 may include standard and non-standard vendor devices, operating systems, and 3PPs. Such devices 102-106 may use different types of storage media, databases, and communication links than the ones described above. In addition, such devices 102-106 may use different amounts of hardware resources.

Client device 108 may interact with VES device 110. By using client device 108, a user may answer questions that are related to a particular application, and send the answer to VES device 110. In addition, client device 108 may allow the user to view, store, and/or report results of analyses performed at VES device 110. In some embodiments, client device 108 may allow the user to control the format in which the results are displayed, stored, and/or reported.

VES device 110 may determine whether an application may be ported from one computing environment to another (e.g., from a legacy computing environment to a pod environment or from a pod environment to a pool environment). In determining the portability, VES device 110 may receive information about the application from client device 108, analyze the information, and transmit results of the analysis to client device 108.

Figure 2:
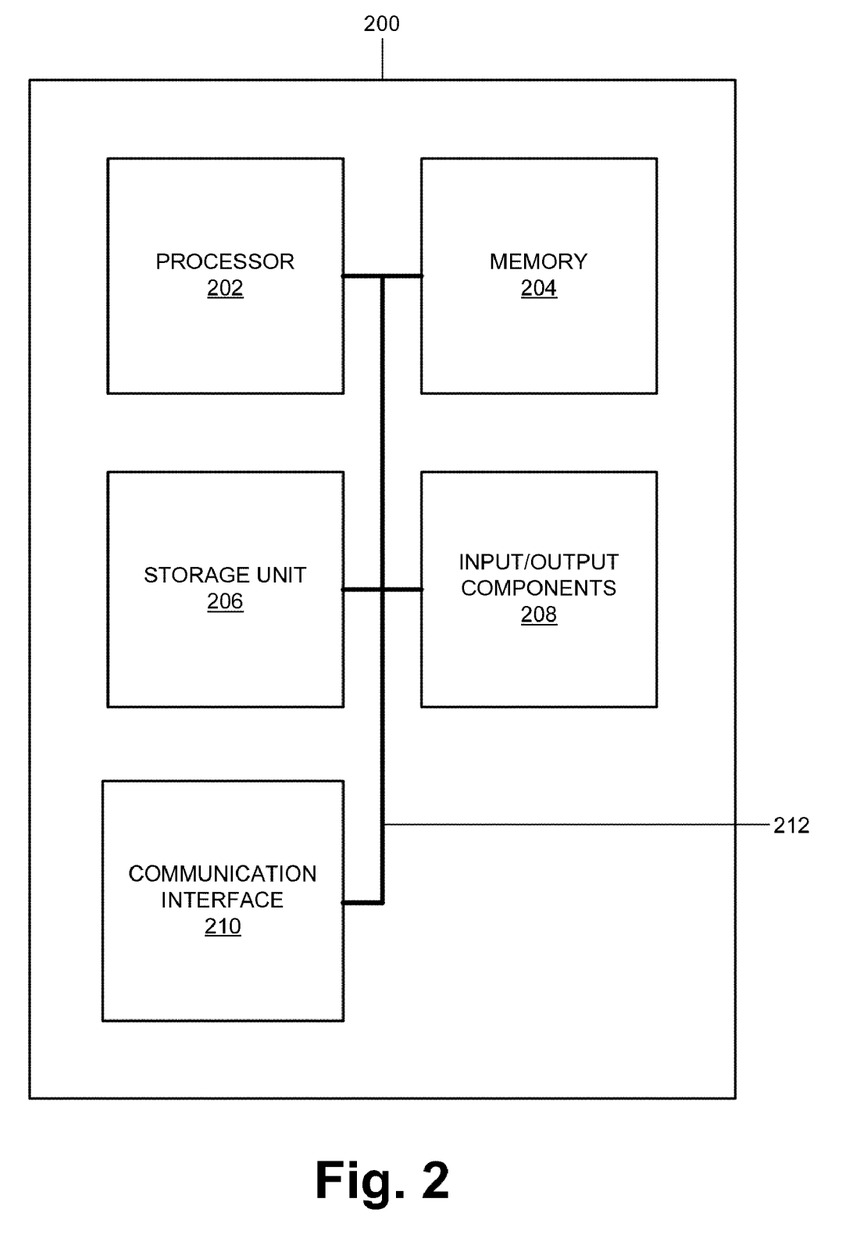
FIG. 2 is a block diagram of exemplary components of a network device of the network shown in FIG. 1.

FIG. 2 is a block diagram of exemplary components of a network device 200. Network device 200 may represent any of devices 102 through 110 in FIG. 1. As shown, network device 200 may include a processor 202, memory 204, storage unit 206, input/output components 208, communication interface 210, and bus 212. In a different embodiment, network device 200 may include additional, fewer, or different components. For example, network device 200 may include one or more power supplies, fans, motherboards, video cards, etc.

Processor 202 may include one or more processors, microprocessors, application specific integrated circuits (ASICs), field programmable gate arrays (FPGAs), or other processing logic that may interpret and execute instructions. Memory 204 may include static memory, such as read only memory (ROM), and/or dynamic memory, such as random access memory (RAM) or onboard cache, for storing data and machine-readable instructions. Storage unit 206 may include a magnetic and/or optical storage/recording medium. In some embodiments, storage unit 206 may be mounted (e.g., UNIX mount) under a directory tree or mapped to a drive.

Input/output components 208 may include a display (e.g., a cathode ray tube, a liquid crystal display (LCD), an organic light emitting diode (OLED) display, etc.), a keyboard, a mouse, a speaker, a microphone, a Digital Video Disk (DVD) writer, a DVD reader, Universal Serial Bus (USB) ports, and/or other types of components for converting events or phenomena to and/or from digital signals that pertain to network device 200.

Communication interface 210 may include any transceiver-like mechanism that enables network device 200 to communicate with other devices and/or systems. For example, communication interface 210 may include mechanisms for communicating via a network, such as a wireless network. In these embodiments, communication interface 210 may include one or more radio frequency (RF) transmitters, receivers and/or transceivers and one or more antennas for transmitting and receiving RF data. For example, communication interface 210 may include a radio or television tuner, a mobile telephone transceiver, etc. Communication interface 210 may also include a modem or an Ethernet interface to a LAN or other network for communicating with other devices. Bus 212 may provide an interface through which components of network device 200 may communicate with one another.

FIGS. 3 through 6A illustrate functional components of legacy server devices 102, pod device 104, pool device 106, and VES device 110. For simplicity and ease of understanding, FIGS. 3-6A do not show all components of devices 102-106 and 110 (e.g., an operating system (e.g., UNIX, Windows, Linux, etc.)). In addition, depending on the embodiment, each of devices 102-106 and 110 may include fewer, additional, or different devices than those illustrated in FIGS. 3-6A. For example, in one embodiment, legacy server device 102 may include additional software components (e.g., device drivers).

Figure 3:
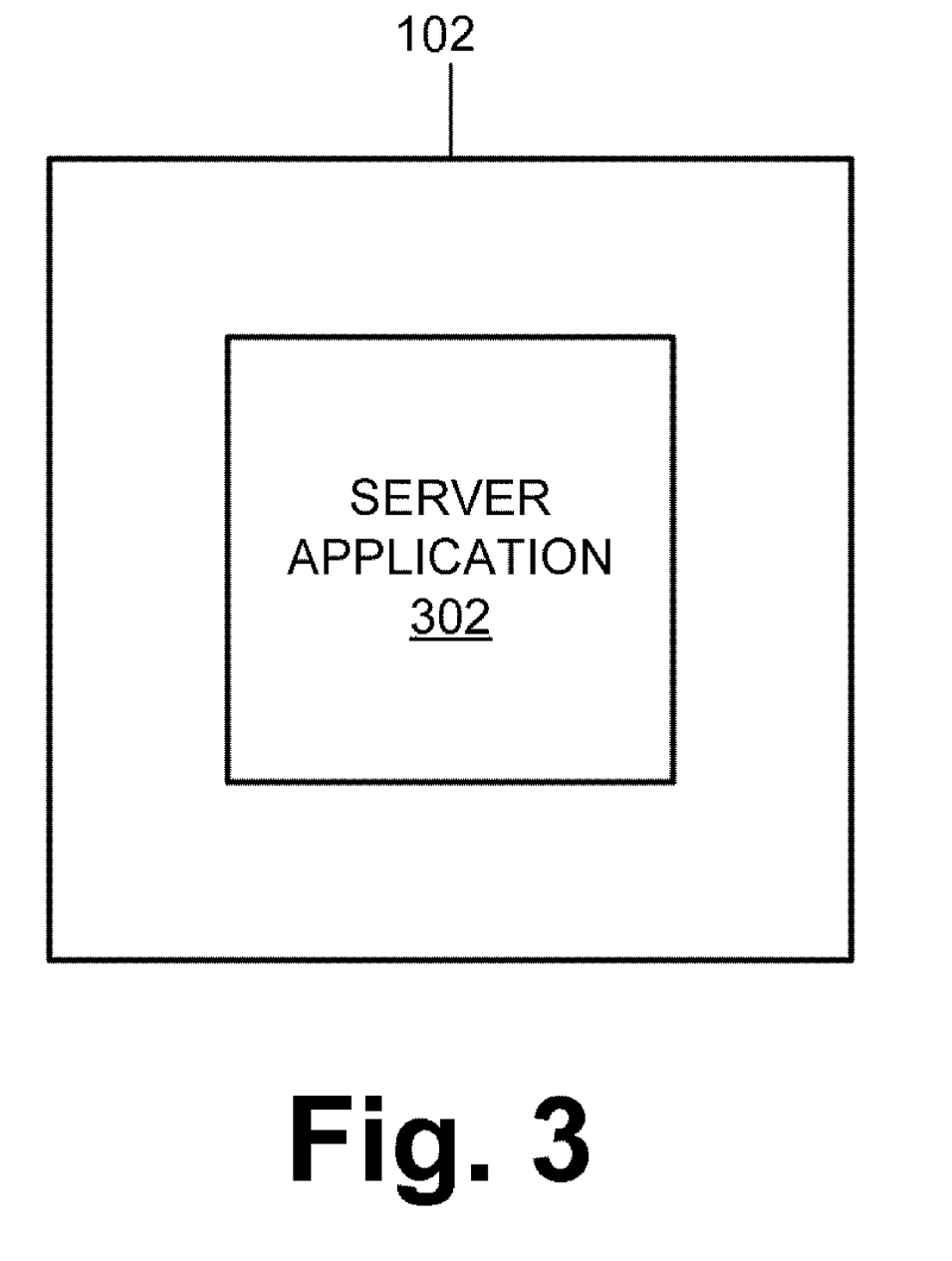
FIG. 3 is a block diagram illustrating an exemplary functional component of a server device of the network shown in FIG. 1.

FIG. 3 is a block diagram illustrating an exemplary functional component of legacy server device 102. As shown, legacy server device 102 may include server application 302, which may be instantiated in memory 204 when code that corresponds to server application 302 in storage unit 206 is executed by processor 202. Server application 302 may perform a specific set of tasks for its clients.

Figure 4A:
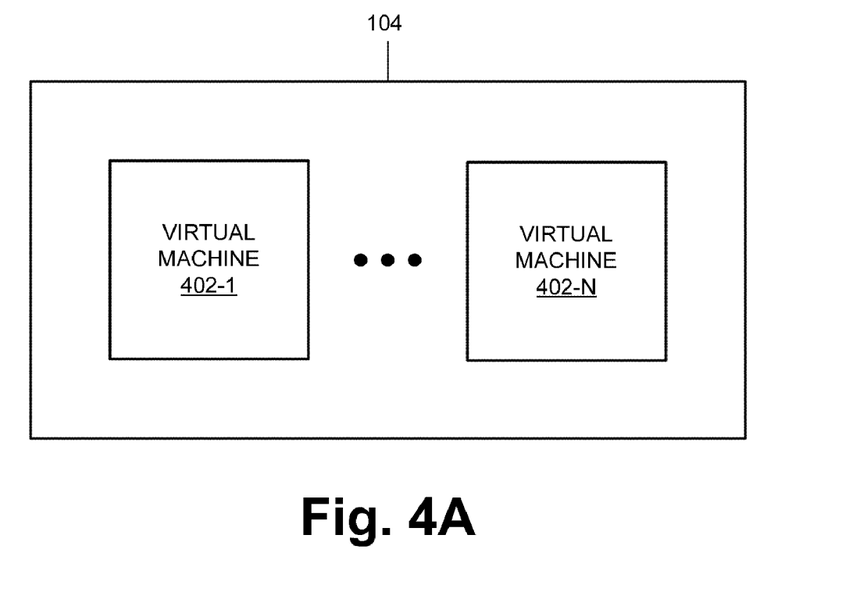
FIG. 4A is a block diagram illustrating exemplary functional components of a pod device of FIG. 1.

FIG. 4A is a block diagram illustrating exemplary functional components of pod device 104. As shown, pod device 104 may include virtual machines 402-1 through 402-N (collectively referred to as virtual machines 402 and individually as virtual machine 402-$x$). Virtual machine 402-$x$, which may be instantiated in memory 204, may include a software simulation of a hardware and/or software computer environment. As such, virtual machine 402-$x$ may behave like a stand-alone computer, with its own virtual storage unit, virtual communication interface, virtual operating system, etc.

Figure 4B:
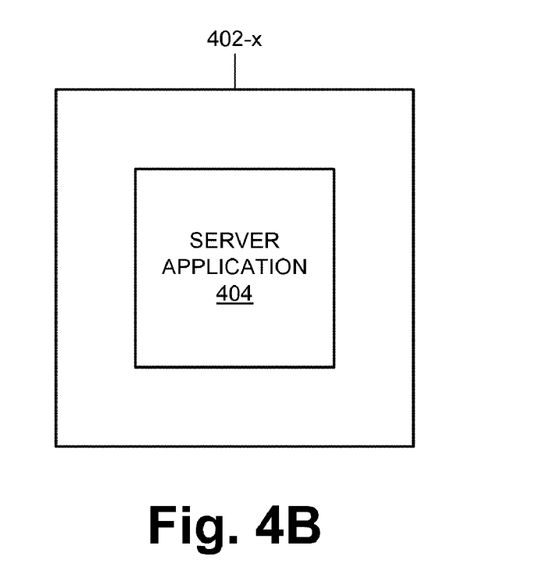
FIG. 4B is a block diagram illustrating an exemplary functional component of a virtual machine of FIG. 4A.

FIG. 4B is a block diagram illustrating an exemplary functional component of virtual machine 402-$x$. As shown, virtual machine 402-$x$ may include a server application 404 (e.g., Sendmail, Internet Information Services/Server, etc.). Each virtual machine 402-$x$ in pod device 104 may provide a pod environment for application 404.

Figure 5A:
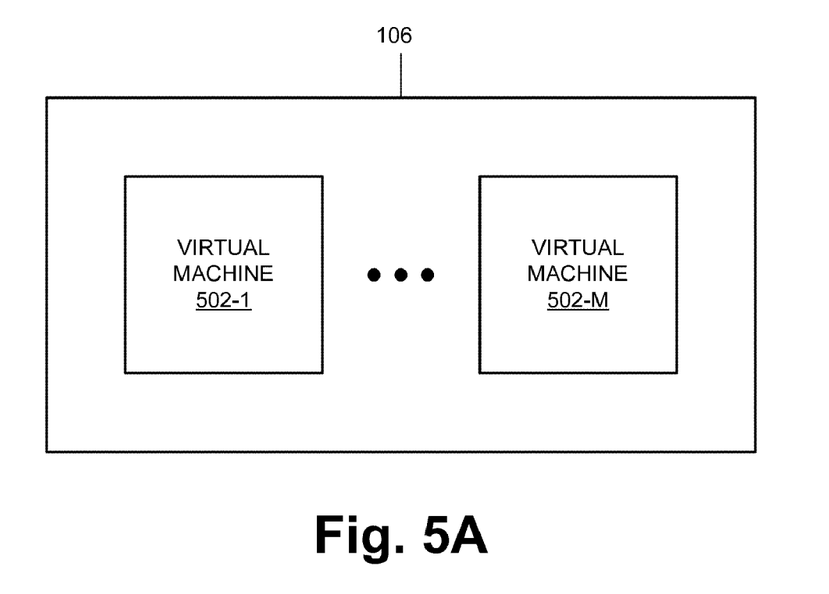
FIG. 5A is a block diagram illustrating exemplary functional components of a pool device of FIG. 1.

FIG. 5A is a block diagram illustrating exemplary functional components of pool device 106. As shown, pool device 106 may include virtual machines 502-1 through 502-M (collectively referred to as virtual machines 502 and individually as virtual machine 502-$x$). Virtual machine 502-$x$, which may be instantiated in memory 204, may include a software simulation of a hardware and/or software computer environment. As such, virtual machine 502-$x$ may behave like a stand-alone computer, with its own virtual storage unit, virtual communication interface, virtual operating system, etc.

Figure 5B:
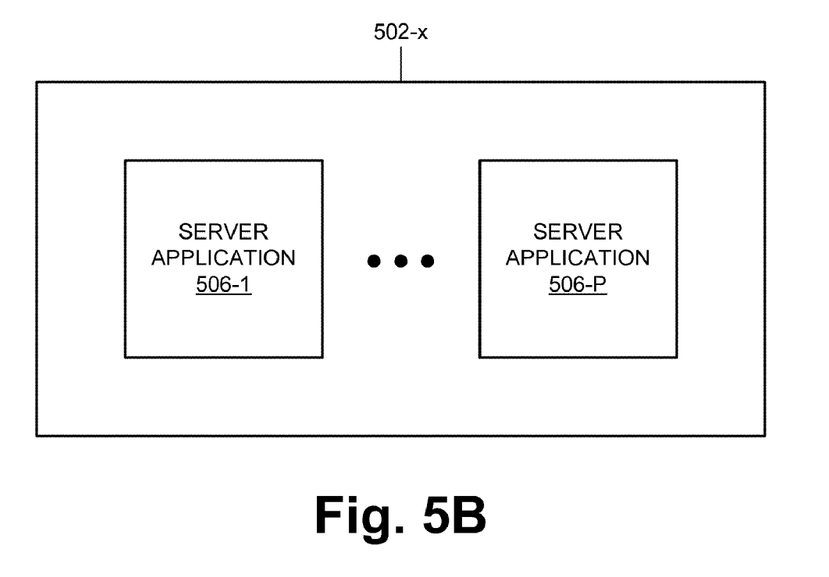
FIG. 5B is a block diagram illustrating exemplary functional components of a virtual machine of FIG. 5A.

FIG. 5B is a block diagram illustrating exemplary functional components of virtual machine 502-$x$. As shown, virtual machine 502-$x$ may include server applications 506-1 through 506-P. Virtual machine 502-$x$ in pool device 108 may provide a pool environment for applications 506.

Figures 6A, 6B:
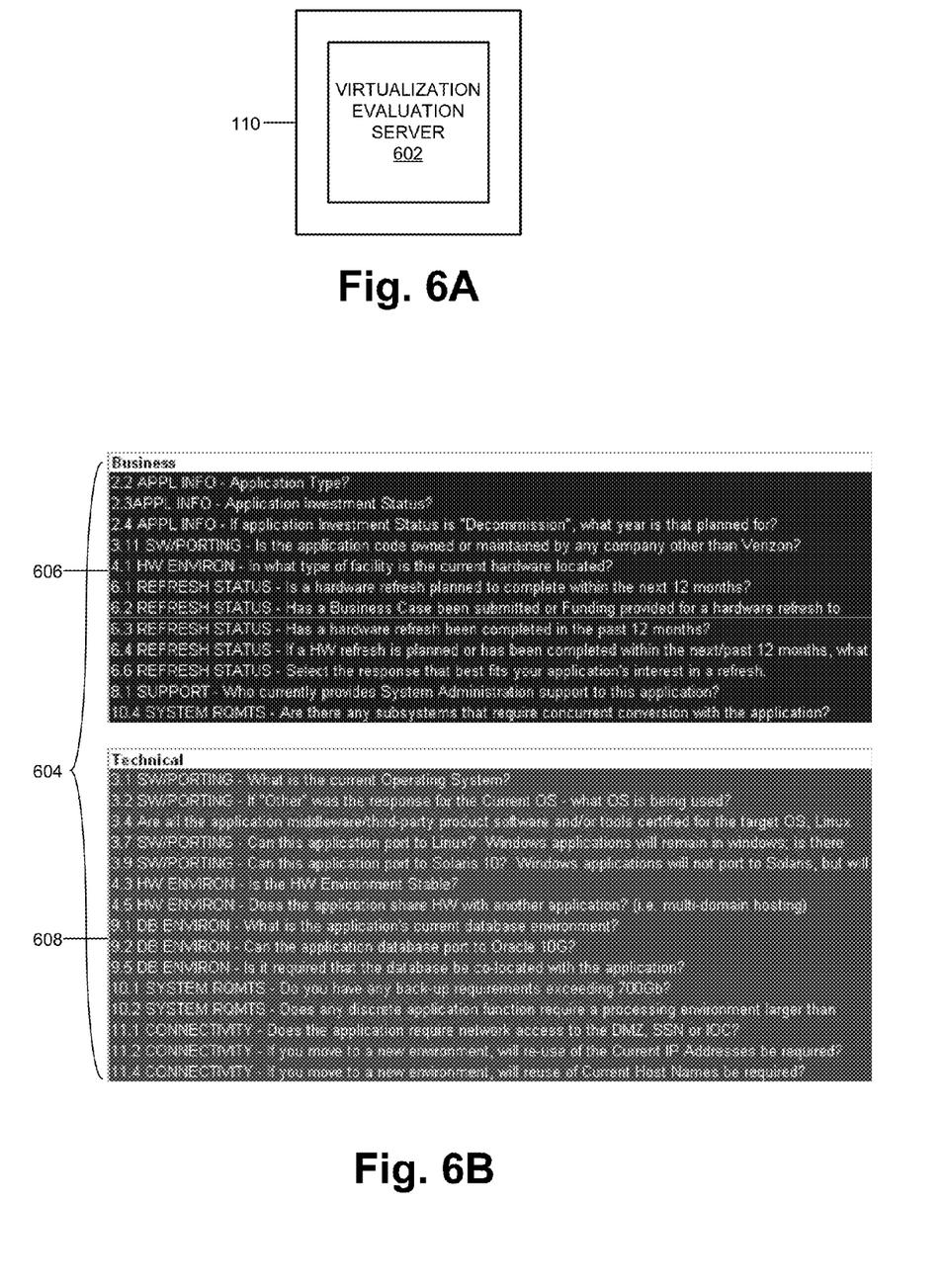
FIG. 6A is a block diagram illustrating an exemplary functional component of a virtualization evaluation server (VES) device of FIG. 1.
FIG. 6B shows a list of exemplary questions that the VES device of FIG. 1 may provide to a client device of FIG. 1.

FIG. 6A is a block diagram illustrating an exemplary functional component of VES device 110. As shown, VES device 110 may include an instance of a virtualization evaluation sever (VES) 602. VES 602 may be instantiated in memory 204 when code that corresponds to VES 602 in storage unit 206 is executed by processor 202.

VES 602 may receive information about an application from client device 108, analyze the information to determine whether the application may be ported from one computing environment to another, and transmit results of the analysis to client device 108. In addition, VES 602 may provide other services that are related to the analysis to client device 108, such as, for example, storing the results and/or reporting the results to interested parties.

The information that VES 602 uses to analyze the portability of an application may be based on answers to questions that are provided to users via client device 108. FIG. 6B shows a list of questions 604 that VES 602 may send to client device 108. As shown, questions 604 may include one or more types of questions, e.g., business questions 606 and technical questions 608. Depending on the embodiment, questions 604 may include additional, fewer, or different types of questions than those illustrated in FIG. 6B. For example, in place of business questions 606 and technical questions 608, questions 604 may include questions that are related to time periods associated with porting the application (e.g., a number of man-hours needed to modify the application), marketability, etc.

Business questions 606 may include questions that pertain to information on business justifications for porting the application. For example, question 8.1 is "Application investment status?" A possible answer may be "submitted request," "pending," and/or "approved." Some of other questions may be related to: the type of application; the type of facility in which the current hardware for the application is located; an identity of an owner of source code of the application; whether a business case has been submitted or funding provided for a hardware refresh (e.g., update); whether a hardware refresh is to be completed within a year; whether a hardware refresh has been completed within a year; an identity of a system administrator that provides support for the application; identities of subsystems that require concurrent porting; etc.

Technical questions 608 may include questions that pertain to technical feasibility of porting the application. For example, question 3.1 is "What is the current Operating System?" A possible answer may be "Windows," "Linux," or "MacOS." Some of other questions may be related to: whether the application can be ported to a target operating system (e.g., Linux, Solaris, etc.); whether all application middleware or 3PP software and/or tools are certified for the target operating system; whether a hardware environment for the application is stable; whether the application shares a hardware environment with another application; whether data in a database for the application can be ported to Oracle database (e.g., Oracle 10G); an identity of the current database environment; whether a database for the application needs to be co-located with the application (e.g., on a same device); whether a backup for the application requires storage space that is greater than a particular amount (e.g., 700 gigabytes); whether the application needs to access a particular network (e.g., Demilitarized zone (DMZ), secure server network (SSN), etc.); whether the application needs to re-use the current IP address after being ported to a new environment; whether the application needs to re-use the current hostname after being ported; etc.

Given a particular application, when client device 108 provides answers to each of questions 608 from a user to VES 602, VES 602 may use the answers to analyze whether the application may be ported from one computing environment (e.g., legacy server device 102) to another computing environment (e.g., pod device 104). During the analysis, VES 602 may classify the application into one of several categories based on the answers.

Figure 7:
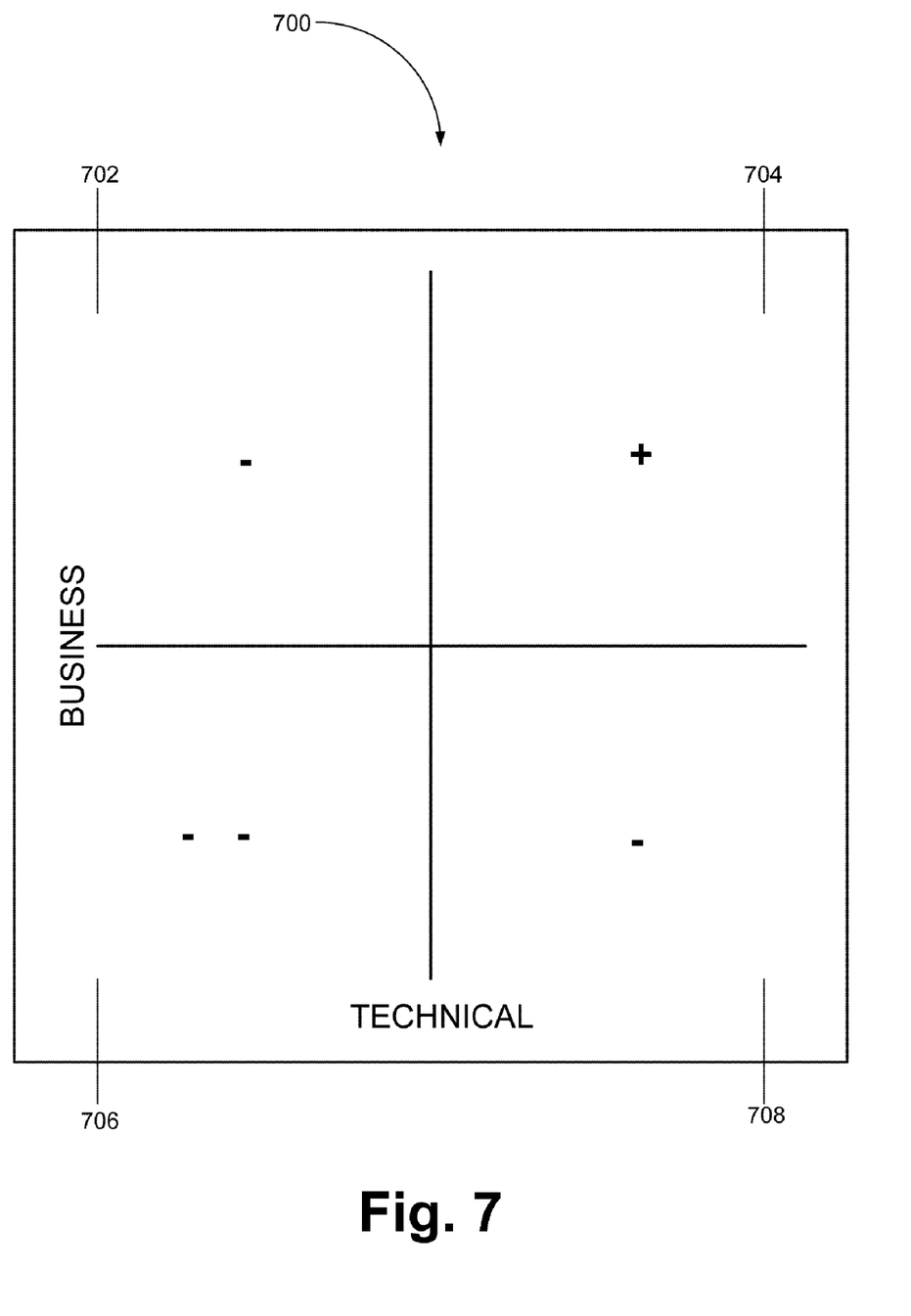
FIG. 7 illustrates an exemplary classification system that a VES of FIG. 6A uses to determine whether an application may be ported from one computing environment to another computing environment.

FIG. 7 illustrates an exemplary classification system that VES 602 may use to determine the portability of application 404. As shown, the classification system includes a square 700 that is partitioned into four quadrants B−T 702, B+T 704, −B−T 706, and T−B 708. Depending on the embodiment, square 700 may be partitioned into additional or fewer areas. In a different embodiment, VES 602 may use an N-dimensional box instead of a square, where each axis corresponds to a score computed based on answers to one type or class of questions that may be asked at client device 108. For example, the horizontal axis of square 700 may correspond to a score computed based on answers to business questions, and the vertical axis 700 may correspond to a score computed based on answers to technical questions.

Each of quadrants B−T 602, B+T 604, −B−T 606, and T−B 608 may represent a particular class into which an application may be categorized. In one embodiment, B−T 702, B+T 704, −B−T 706, and T−B 708 may represent, respectively, an area of high business justification and low technical feasibility, an area of high business justification and high technical feasibility, an area of low business justification and low technical feasibility, and an area of low business justification and high technical feasibility.

Figure 8A:
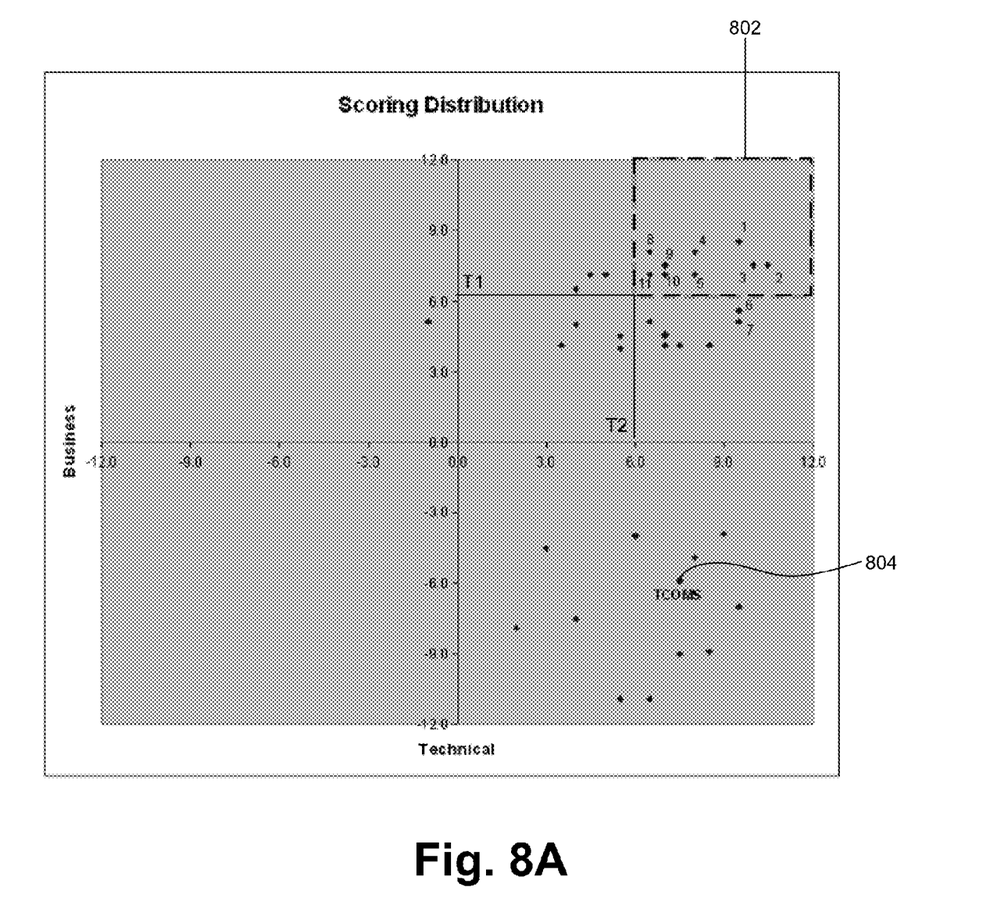
FIG. 8A shows exemplary results of applying the classification system of FIG. 7 to applications.
Figure 8B:
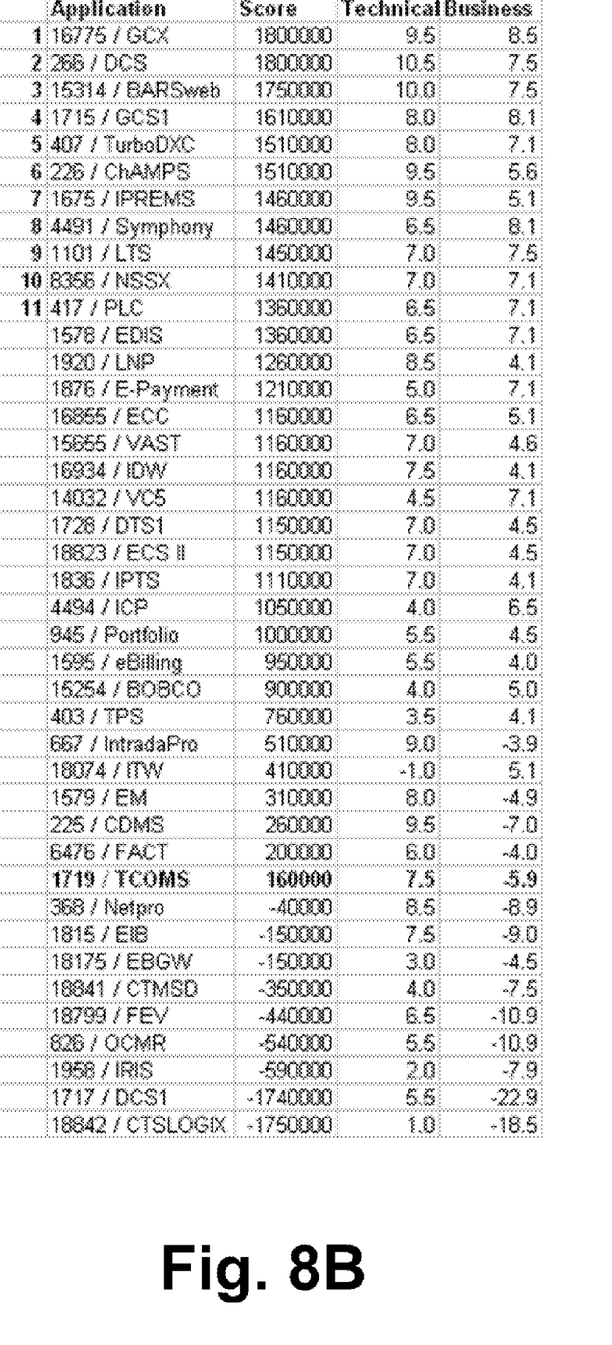
FIG. 8B shows a list of exemplary applications that are classified in FIG. 8A.

FIG. 8A shows a result of applying the classification system of FIG. 7 to applications, and FIG. 8B shows a list of the applications that are classified in FIG. 8A. As shown, each application listed in FIG. 8B may be scored on business justifications and technical feasibility. For each application, a point may be plotted on square 700 based on the scores.

For example, application OCX is shown in FIG. 8B as having a business justification score of 8.5 and a technical feasibility score of 9.5. Accordingly, a point labeled 1 is plotted on FIG. 8A. Similarly, application DCS is shown in FIG. 8B as having a business justification score of 7.5 and a technical feasibility score of 10.5, and plotted as point 2 in FIG. 8A.

In addition to points that represent each of the applications in FIG. 8B, FIG. 8A shows a high priority candidate selection box 802, in which applications that are rated higher than threshold T1 in business justification and threshold T2 in technical feasibility are plotted. High priority candidate selection box 802 illustrated in FIG. 8A includes points 1-5 and 8-11, but excludes points 6 and 7. The applications that correspond to points 1-5 and 8-11 may be given the highest priority in being selected for porting from one computing environment to another computing environment.

Applications that correspond to points that are outside of high-priority candidate selection box 802 may be accorded lower priority. For example, TCOM application (FIG. 8B) that corresponds to point 804 may be given lower priority, because, although the technical feasibility of porting TCOM application is high (i.e., 7.5), the business justification associated with TCOM application is low (i.e., −5.9).

In a different embodiment, applications may be prioritized based on a different scheme. For example, in one scheme, for each application, a point may be plotted on a graph based on a pair of non-negative scores for business justification and technical feasibility. In such a scheme, applications that correspond to points whose distances from the origin are greater than a threshold may be accorded higher priorities.

For example, assume that application TAX (not shown) is associated with a pair of business justification and technical feasibility scores, which is (4.5, 6.5). In addition, assume that the threshold is 5. In this case, the distance between a point that corresponds to application TAX and the origin is greater than 5 (e.g., square root of $(4.5\times 4.5+6.5\times 6.5)=7.1<5$). Therefore, application TAX may be accorded a higher priority than applications with points whose distances from the origin are less than 5.

Figure 9:
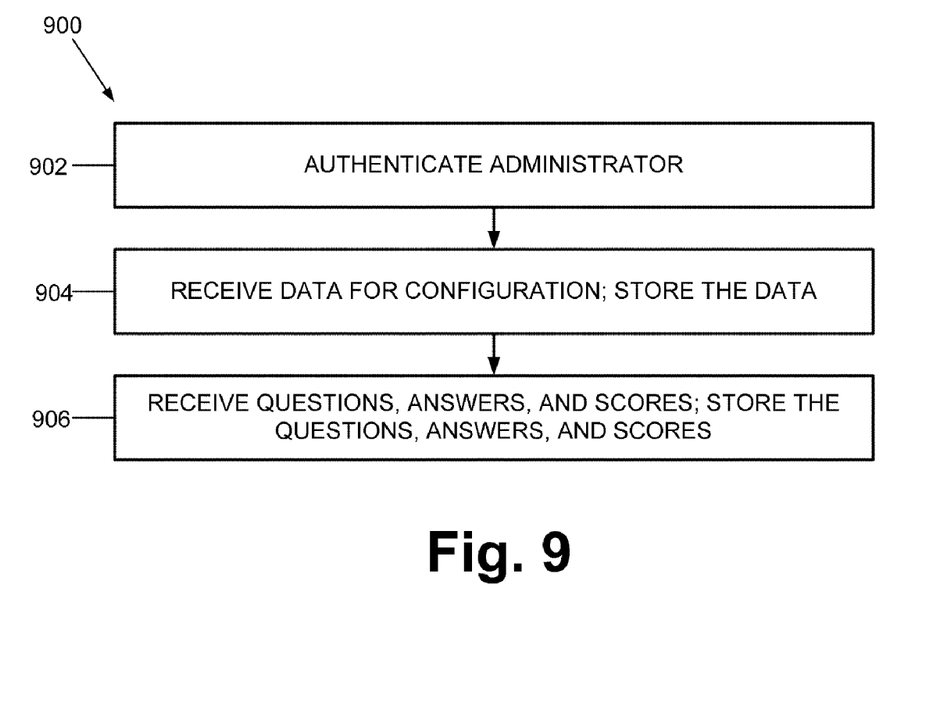
FIG. 9 is a flowchart of an exemplary process for configuring the VES of FIG. 6A.

FIG. 9 is a flowchart of an exemplary process 900 for configuring VES 602. As shown, process 900 may start with authenticating an administrator (block 902). For example, the administrator may login at VES 602 by inputting a user name and a password at a client application or a browser hosted by client device 108.

Once the administrator is authenticated and logged in, VES 602 may receive configuration data from client device 108 (e.g., input by the administrator into client device 108) (block 904). For example, the administrator may assign parameters (e.g., T1 and T2 for setting high priority candidate box 802) for VES 602 and/or instruct VES 602 to create a user account (e.g., create a user name and a password). VES 602 may receive such parameters and/or instructions via the client application or the browser hosted by client device 108.

VES 602 may receive questions, answers, and/or scores that may be used by VES 602 to determine the portability of an application from pod device 104 to pool device (block 906). The administrator may input the questions to VES 602 at client device 108. In addition, for each question, the administrator may also input a set of answers and/or scores. For example, assume that the administrator inputs "Can the application be ported to Oracle 10G?" (FIG. 6B). For the question, the administrator may also input answers "Yes" and "No," as well as scores "+2" and "−2" that correspond to the answers, respectively.

VES 602 may store the questions, answers, and scores (block 906). In one embodiment, VES 602 may store the questions, answers, and scores that are received from client device 108 in a local database. In addition, VES 602 may allow the administrator to modify the scores, recalibrate the questions (e.g., weight each question differently), modify answers, etc.

Figure 10:
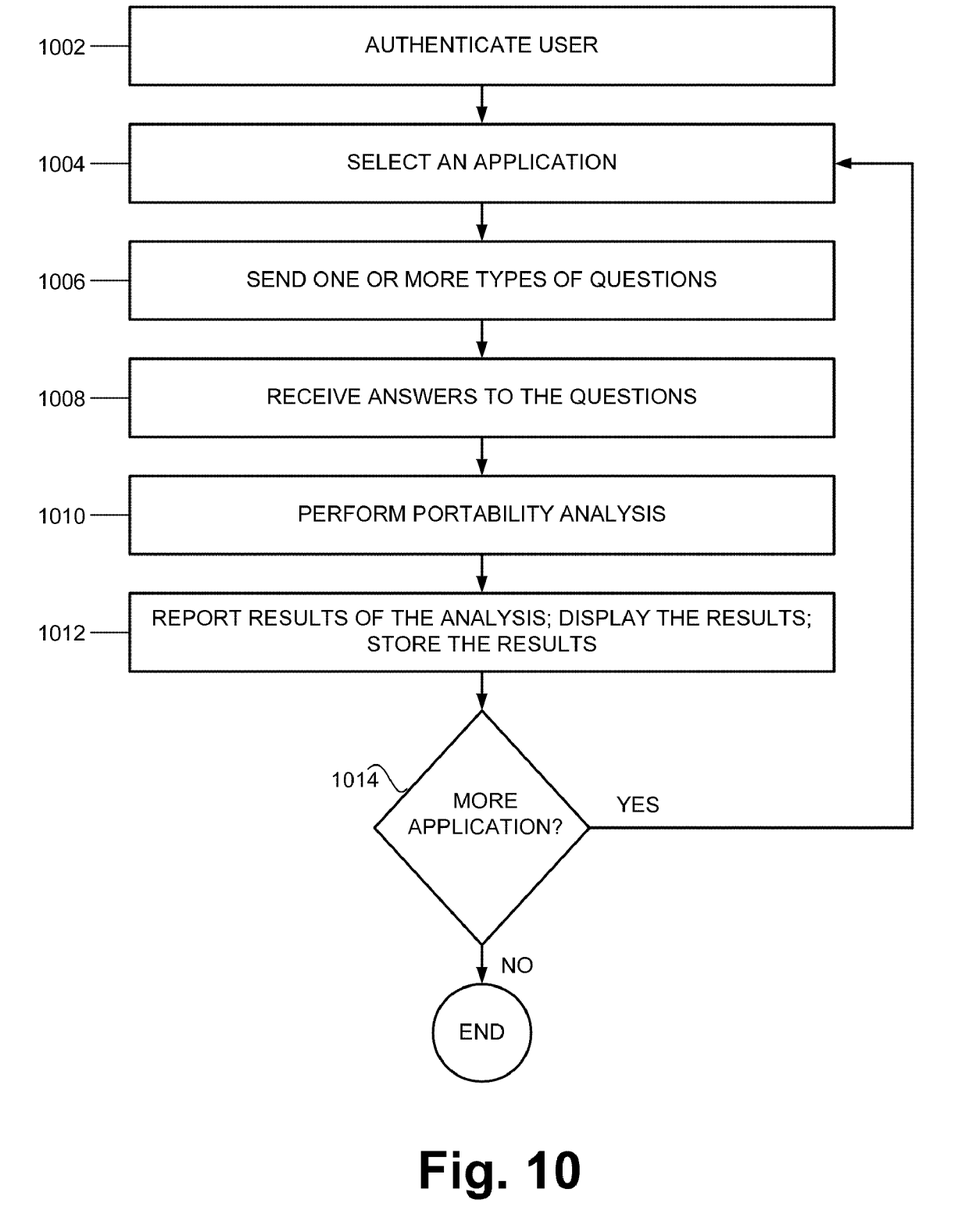
FIG. 10 is a flowchart of an exemplary process for analyzing portability of an application from one computing environment to another computing environment.

FIG. 10 is a flowchart of an exemplary process 1000 for analyzing portability of an application from one computing environment (e.g., legacy server device 102 or pod device 104) to another environment (e.g., pod device 104 or pool device 106). Process 1000 may begin by authenticating a user (block 1002). In one embodiment, as described above, the user's account may have been created by the administrator.

The user may select an application for analyzing the portability of an application from one computing environment to another (block 1004). The user may designate, via the client application or the browser running on client device 108, a particular application that the user wants VES 602 to analyze. For example, in one embodiment, the user may type in the name of the application into the browser at client device 108. In a different embodiment, the user may select a name of the application from a list (e.g., an item of a list menu).

One or more types of questions may be sent (block 1006). In one embodiment, questions (e.g., questions on business justification and/or technical feasibility) that the administrator input at block 906 may be sent from VES 602 to client device 108. For multiple choice questions, the choices may also be sent to client device 108. When client device 108 receives the questions, client device 108 may display the questions/answers (e.g., choices) to the user. In response, the user may provide/select answers to the questions via the browser/client application.

VES 602 may receive the answers to the questions (block 1008). The answers provided by the user may be sent, by the browser/client application, to VES 602 over network 100. VES 602 may perform a portability analysis for the selected application (block 1010). After receiving the answers, VES 602 may tally the score for the application based on the answers. In one embodiment, the answer to each question may be weighted in accordance with its importance (e.g., score) with respect to, for example, business justification or technical feasibility as configured in process 900.

VES 602 may report, display, or store the results of the analysis (block 1012). For example, VES 602 may analyze and display the result of analyzing a single application. In some situations, VES 602 may analyze and display results of analyzing a set of applications. The results may be shown to the user via an appropriate graphical user interface (GUI), such as, for example, the plot shown in FIG. 8A.

If there are more applications to be analyzed (block 1014—YES), process 1000 may proceed to block 1004. Otherwise (block 1014), process 1000 may end.

Figure 11:
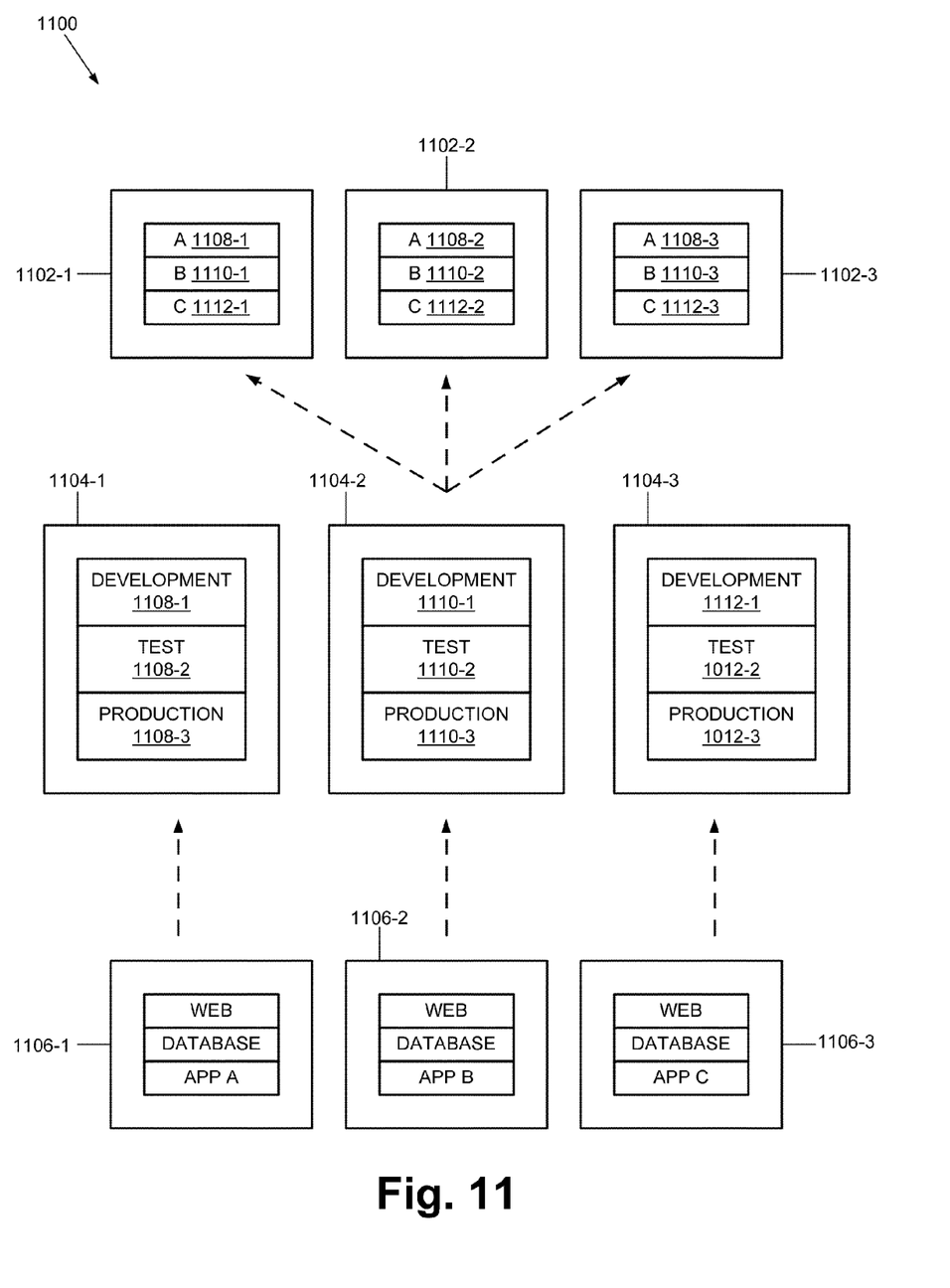
FIG. 11 illustrates an example associated with porting applications in a pod virtualization environment to a pool virtualization environment.

The following example, in conjunction with FIG. 11, illustrates processes associated with analyzing the portability of applications from one computing environment to another environment and using the analysis to port the applications.

Assume, as shown in FIG. 11, that a system 1100 includes a development pool device 1102-1, a testing pool device 1102-2, a production pool device 1102-3, pod devices 1104-1 through 1104-3, and legacy server devices 1106-1 through 1106-3. In addition, assume that applications A, B, and C are hosted on legacy server devices 1106-1, 1106-2, and 1106-3, respectively, along with corresponding web servers and databases.

In the example, a user wishes to obtain greater efficiency in system 1100, and proceeds to determine the portability of applications running legacy server devices 1106-1 through 1106-3. The user selects application A, B, and C to analyze via a web browser interface, and answers business justification questions and technical feasibility questions for applications A, B, and C.

The answers are sent to VES device 110, which analyzes the answers to provide scores that are associated with applications A, B, and C. Based on the scores, VES device 110 determines that applications A, B, and C belong to B+T 704 quadrant, and that applications may be ported from legacy server devices 1106-1 through 1106-3 to pod devices 1104-1 through 1104-3.

Based on the analysis from VES device 110, the user hosts different versions of applications A, B, and C, respectively, on pod devices 1104-1 through 1104-3. As shown in FIG. 11, pod device 1104-1 includes a development version of application A 1108-1, a test version of application A 1108-2, and a production version of application A 1108-3. Each version of application A runs on its own virtual machine. Similarly, pod devices 1104-2 and 1104-3 include development, test, and production versions of application B (applications 1110-1 through 1110-3) and application C (application 1112-1 through 1112-3), respectively. Each version of applications B and C runs in its own virtual machine.

The user wishes to obtain greater efficiency in system 1100, and uses monitoring tools to identify hardware and/or software resources that applications A, B, and C need. Once the resources are identified, the user accesses VES device 110 to analyze the portability of applications A, B, and C for virtualization in a pool device. VES device 110 analyzes applications A, B and C, and reports the results of analyzing applications A, B, and C to the user via an email message. The reports, in this example, indicate that applications A, B, and C have sufficient business justification and satisfy technical feasibility requirements to be ported from pod environments to pool environments. That is, for each of applications A, B, and C, the business justification score and the technical feasibility score are greater than thresholds T1 and T2, respectively (e.g., points that correspond to applications A, B, and C are within high priority selection box 802).

Subsequent to viewing the reports, the user installs development versions of applications A, B, and C 1108-1, 1110-1, and 1112-1, test versions of applications A, B, and C 1108-2, 1110-2, and 1112-2, and production versions of applications A, B, and C 1108-3, 1110-3, and 1112-3 on pool devices 1102-1, 1102-2, and 1102-3, respectively. Each version of applications A, B, and C are hosted on virtual machines in pool devices 1102-1, 1102-2, and 1102-3.

In the above, VES device 110 determines the portability of an application from one computing environment to another computing environment. By porting the application from a legacy computing environment to a pod environment and from a pod environment to a pool environment, the user may allow the application to use hardware resources more efficiently. For example, the user may reallocate the hardware resources to increase their utility within the system.

The foregoing description of exemplary embodiments provides illustration and description, but is not intended to be exhaustive or to limit the embodiments described herein to the precise form disclosed. Modifications and variations are possible in light of the above teachings or may be acquired from practice of the embodiments.

Further, while series of acts have been described with respect to FIGS. 9 and 10, the order of the acts may be varied in other embodiments. Moreover, non-dependent acts may be implemented in parallel.

It will also be apparent that various features described above may be implemented in many different forms of software, firmware, and hardware in the embodiments illustrated in the figures. The actual software code or specialized control hardware used to implement the various features is not limiting. Thus, the operation and behavior of the features of the invention were described without reference to the specific software code—it being understood that one would be able to design software and control hardware to implement the various features based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

In the above, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    identifying an application for potential porting from a first computing environment to a second computing environment associated with a client device, wherein the first computing environment comprises one of a pod environment or a pool environment and the second computing environment comprises another of the pod environment or the pool environment;
    sending, to the client device, two or more sets of questions related to two or more different question-types for porting the identified application;
    receiving answers to at least some of the two or more sets of questions from the client device;
    obtaining a respective score for each of the two or more different question-types based on the answers;
    determining a particular priority classification, of a plurality of priority classifications for porting candidate applications from the first computing environment to the second computing environment, based on the respective scores relative to a parameter associated with each of the two or more different question-types; and
    sending results of the determination to the client device.

2. The method of claim 1, wherein sending results of the determination includes:
    sending the respective scores that correspond to the two or more different question-types, including a business justification score associated with the potential porting of the identified application and a technical feasibility score associated with the potential porting of the identified application.

3. The method of claim 1, wherein sending two or more sets of questions includes:
    sending questions of a first question-type related to a business justification associated with the potential porting of the identified application, and
    sending questions of a second question-type related to a technical feasibility associated with the potential porting of the identified application.

4. The method of claim 2, further comprising:
    determining that the identified application is to be ported, wherein the business justification score is greater than a first threshold by a first amount and the technical feasibility score is greater than a second threshold by a second amount.

5. The method of claim 4, further comprising:
    receiving at least one of the first threshold or the second threshold from a device, wherein the first amount differs from the second amount.

6. The method of claim 1, wherein determining a particular priority classification further comprises:
    determining the particular priority classification irrespective of storage devices and network connectivity associated with the client device.

7. The method of claim 1, further comprising:
    porting, based on the results, the identified application to the client device for hosting a plurality of different versions of the ported application.

8. A device comprising:
    a memory to store a set of questions related to at least one of business justification or technical feasibility associated with potential porting of a plurality of applications;
    a communication interface to:
    send the set of questions, to a client, to determine a particular priority classification, of a plurality of priority classifications, for porting of an application, of the plurality of applications, from a first computing environment to a second computing environment, wherein the first computing environment comprises one of a pod environment or a pool environment and the second computing environment comprises another of the pod environment or the pool environment, and
    receive, from the client, answers to at least the set of questions; and
    a processor to:
    calculate a score based on the answers, the score indicating the particular priority classification for porting the application from the first computing environment to the second computing environment, and relay the score to the communication interface, to send the score to the client to be displayed.

9. The device of claim 8, wherein the set of questions includes:
a set of questions related to business justification; and
a set of questions related to technical feasibility, and wherein the processor is further configured to determine the particular priority classification based on a first score for the business justification and a second score for the technical feasibility.

10. The device of claim 9, wherein the questions related to business justification are related to at least a plurality of:
an investment status of the application;
an identity of an owner of source code of the application;
whether a refresh of the application is to be completed within a year;
whether a refresh of the application has been completed within a year;
an identity of a system administrator that provides support for the application; or
subsystems that require concurrent porting from the first computing environment to the second computing environment.

11. The device of claim 9, wherein the questions related to technical feasibility are related to at least a plurality of:
an identity of a current operating system on which the application runs;
whether the application can be ported to a Linux operating system;
whether the application can be ported to a Solaris operating system;
whether a hardware environment for the application is stable;
whether the application shares a hardware environment with another application;
whether data in a database for the application can be ported to an Oracle database;
whether a database for the application needs to be co-located with the application on a same device;
whether a backup for the application requires storage space that is greater than a particular number of bytes;
whether the application needs to access a particular network;
whether the application needs to re-use a current Internet Protocol (IP) address after being ported; or whether the application needs to re-use a current hostname after being ported.

12. The device of claim 8, wherein the first computing environment includes a legacy server device and the second computing environment includes a pod device.

13. The device of claim 8, wherein the first computing environment includes a pod device and the virtual second computing environment includes a pool device.

14. The device of claim 8, wherein the second computing environment includes one or more virtual machines.

15. The device of claim 14, wherein each of the one or more virtual machines includes a single instance of the application.

16. The device of claim 14, wherein each of the one or more virtual machines includes one or more instances of the application.

17. The device of claim 14, wherein each of the one or more virtual machines includes at least one of:
a virtual operating system, virtual processor, or virtual communication interface.

18. The device of claim 14, wherein each of the one or more virtual machines includes:
software simulation of a computer.

19. The device of claim 8, wherein the client includes:
a user interface that shows, in a graph with a first axis and a second axis, a plot of points that correspond to applications, the first and second axis representing a degree of business justification for and a degree of technical feasibility in porting the applications from pod environments to pool environments.

20. A non-transitory computer-readable storage medium comprising computer-executable instructions, the computer-executable instructions including instructions for:
receiving input, from a user, including answers to a set of one or more particular types of questions related to an application hosted on a pod environment;
sending the answers to a server device;
receiving, from the server device, a particular priority classification, of a plurality of priority classifications, for porting the application from the pod environment to a pool environment based on a score, calculated from the answers, with respect to a threshold value corresponding to each of the one or more particular types of questions; and displaying the particular priority classification to the user.

* * * * *